Patented May 5, 1953

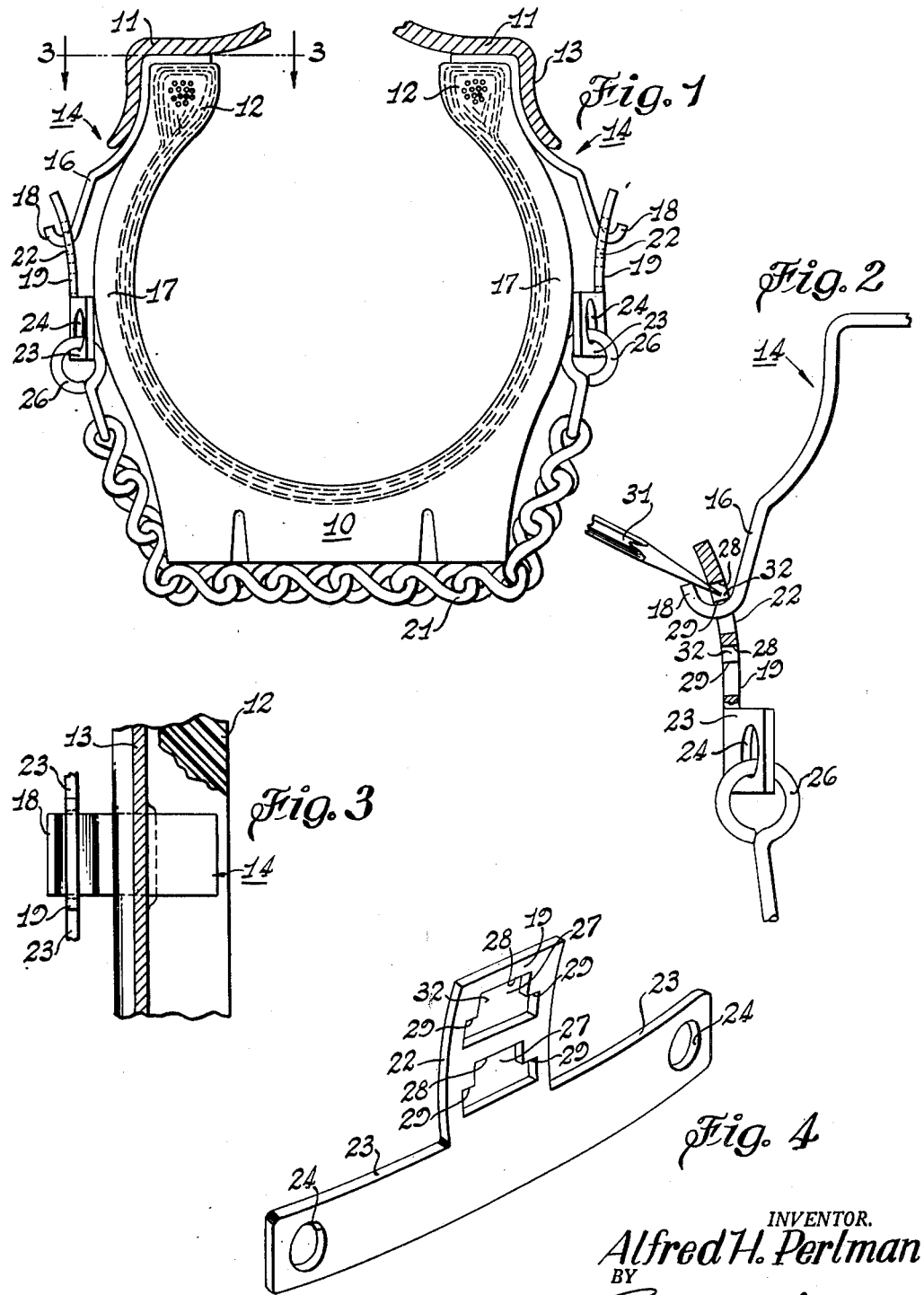

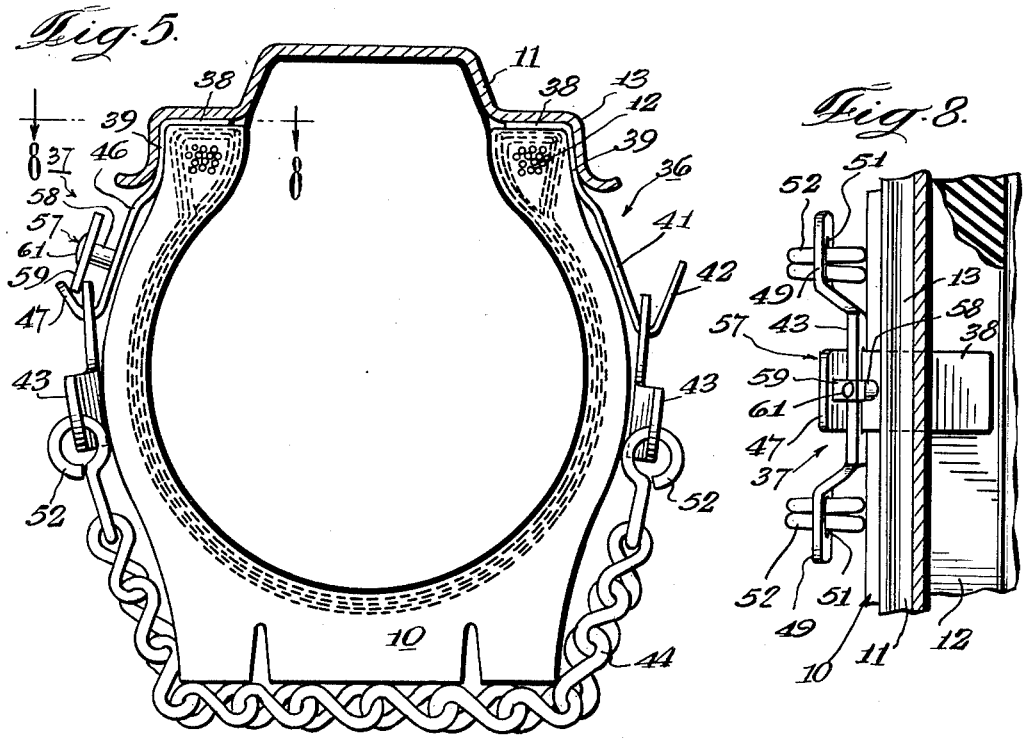
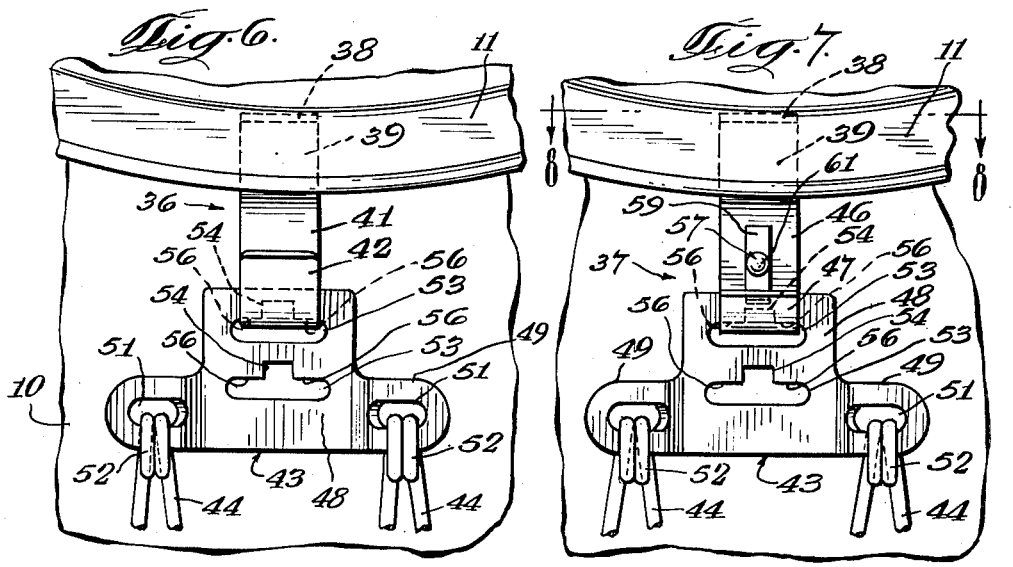

2,637,363

UNITED STATES PATENT OFFICE 2,637,363

TIRE CHAIN CROSS-LINK AND ANCHOR ASSEMBLY

Alfred H. Perlman, Chicago, Ill., assignor to Fral Manufacturing Co., Chicago, Ill., a corporation of Illinois Application June 27, 1951, Serial No. 233,854

5 Claims. (Cl. 152—213)

1

This invention relates generally to a tire chain cross-link assembly and relates particularly to an assembly whereby the cross-links may readily be removed or applied according to driving conditions.

This application is a continuation-in-part of my pending application Serial No. 141,474, filed January 31, 1950, now abandoned.

One of the principal objects of the invention is to provide a novel cross-link assembly for an automobile tire, the assembly being characterized by a pair of anchor members held at each side of the tire between the bead thereof and the support rim, each of said anchor members being provided with a hook for holding a chain hanger which carries the cross-links spanning the tread of the tire.

A further object is to afford a construction for a cross-link assembly so arranged that the cross-links may readily be removed, and so arranged that the cross-links may be adjusted with respect to their anchors on each side of the tire, according to the size thereof.

Still another object is to provide a construction for a tire chain and cross-link assembly wherein one of the cross-link anchors is arranged to provide a hook for holding a chain hanger for the cross-link, said hook being of such a dimension as to prevent unintended movement of the chain hanger off the hook, the other of the cross-link anchors also terminating in a hook for a chain hanger connected to the opposite end of the cross-link, and having disposed therewith a positive lock or swivel holding the opposite chain hanger in position on the hook, and in such a fashion that the assembly cannot be disengaged without release of the lock or swivel.

Other and important objects of the invention will be apparent from a study of the specification following taken together with the drawings which together illustrate a number of preferred embodiments of the invention and what are now regarded to be the best modes of applying the principles thereof. While the invention is described in terms of embodiments which it may assume in practice, its scope is not intended to be limited by the precise embodiments shown nor otherwise than by the claims subjoined.

In the drawings:

Fig. 1 is a cross-section through a pneumatic tire showing the cross-link assembly according to one embodiment of the present invention in front elevation;

Fig. 2 is a front elevation view of the cross-link assembly of Fig. 1, parts thereof being shown in section to illustrate the manner in which the cross-links may be secured to and removed from their anchors;

Fig. 3 is a section taken along the line 3—3 of Fig. 1;

Fig. 4 is a perspective view of the cross-chain hanger shown in Figs. 1, 2, and 3;

Fig. 5 is a cross-section through a pneumatic tire showing a cross-link assembly according to another embodiment of the invention in front elevation;

Fig. 6 is a side elevation view thereof looking from the right to the left as seen in Fig. 5;

Fig. 7 is a side elevation view thereof looking from the left to the right as seen in Fig. 5; and Fig. 8 is a view taken along the line 8—8 of Fig. 5 showing one of the cross-link hangers and anchor therefor in plan view.

Referring now particularly to Figs. 1 and 2 of the drawing, the present invention is shown as applied to a tire 10 which is held by inflation thereof to a rim 11 of the drop-center type commonly used on the modern automobile. The tire 10, as is well known, is inflated by a tube, not shown, which exerts a large lateral and radial pressure to maintain beads 12 firmly against the rim 11 and side flanges 13 thereof.

The bead 12 and the rim 11 and flange 13 are adapted to hold a tire chain anchor device, indicated generally by the ordinal 14, in position therebetween upon inflation of the tire 10. The tire chain anchor device 14 includes a portion 16, which is spaced from the side walls 17 of the tire 10, and which preferably diverges therefrom to provide for free flexing of the tire. The end of the anchor device 14 remote from its point of anchor between the rim and flange 11, 13 and the bead 12 is provided with a flat hook 18 to provide a place of hooking engagement for a hanger 19, to which is connected a pair of cross-links 21 which span the tread of the tire 10.

It should be noted that the tire chain anchor devices are made of hardened and tempered steel to withstand the centrifugal forces induced by rotation of the tire 10 upon its wheel.

The hangers 19 are preferably T-shaped and include a tongue 22 and a pair of arms 23 having apertures 24 near the ends thereof to receive a hook 26 of the cross-link 21. As shown with particular reference to Figs. 2 and 4, the hanger 19 is curved slightly in two different planes to lend stiffness thereto, and to provide for a certain amount of spring action thereof. It may be noted that after forming the hanger 19 thusly, it is suitably heat treated to provide resilience and strength against conditions imposed by service.

The tongue 22 is provided with a plurality of

T-shaped slots 27 so arranged that a stem 28 of the T-shaped slot 27 extends upward as seen particularly in Figs. 1 and 2. The stem 28 thus defines a pair of shoulders 29 which rest upon the flat hook 18 when the assembly is in the position as seen in Figs. 1 and 2. The stem 28 of the T-shaped slot also defines an opening 32 for an elongated tool such as a screwdriver 31 seen in Fig. 2. By inserting the tool 31 in the opening 32 and then bringing the tool 31 over the edge of the flat hook 18, the hanger may be hooked to the anchor 14, and brought to bear on the shoulders 29 on the flat hook 18 by rocking the tool 31 in a clockwise direction. It will be apparent that by reversing the operation just described, the hanger 19 may be disengaged from its hook 18.

Obviously, it is necessary only to hook the hanger 19 on the anchor 14 at one side of the tire, and to use the method as described in the previous paragraph for connecting the opposite hanger to the opposite anchor. By providing a plurality of T-shaped slots 27 in each hanger 19, any combination of two slots, one in each hanger 19, may be used to hook the cross-link 21 to the anchors 14 in accordance with the size of the tire.

Referring now to Figs. 5 to 8, there is shown another embodiment of the present invention. In this form of the invention, the bead 12, the rim 11 and flange 13 are adapted to hold oppositely disposed tire chain anchor devices indicated respectively and generally by the reference numerals 36 and 37. The tire chain anchor device 36 includes a portion 38 lying along the inner periphery of the bead 12 and between the rim 11 and bead 12, a portion 39 lying between the side of the bead 12 and the rim flange 13, and a portion 41 diverging slightly from the side wall of the tire 10 to provide for free flexing thereof. The portion 41 is bent back upon itself to provide a flat hook 42 for a cross-link chain hanger 43, to which is connected the cross-links 44.

The tire chain anchor device 37 likewise includes a portion 38 lying between the rim 11 and the inner periphery of the bead 12, a portion 39 lying between the side of the bead 12 and the rim flange 13, and a portion 46 diverging slightly from the side wall of tire 10 to permit free flexing thereof. The portion 46 is bent back upon itself to provide a hook 47, of somewhat smaller length than the hook 42 for a purpose as will appear, for holding a similar cross-link chain hanger 43, to which is connected the other end of the cross-links 44.

Both of the anchors 36 and 37 are made of suitable spring steel stock to withstand the strains imposed by the centrifugal forces induced by rotation of the tire 10.

The cross-link chain hangers 43 are preferably T-shaped and include a tongue 48 and a pair of arms 49 having apertures 51 near the ends thereof to receive a hook 52 of the cross-link 44. As shown with particular reference to Fig. 8, the arms 49 are offset with respect to the central tongue 48 to lend increased stiffness thereto, and to provide clearance for the hooks 52 so that they may be freely supported without binding against the side walls of the tire 10. The hangers 43 are punched from flat stock, and are likewise suitably heat treated to provide strength against conditions imposed by service.

The central tongue 48 of the chain hanger 43 is provided with T-shaped slots 53, so disposed that a stem 54 thereof extends upward as seen in Figs. 6 and 7 to define shoulders 56 which rest upon the flat hooks 42 or 47 when assembled as shown in Figs. 5, 6 and 7.

The embodiment of the invention thus far described with reference to Figs. 5 to 8 inclusive is assembled by first hooking one of the chain hangers 43 over the hook 42, and then bringing the cross-links 44 over the tread of the tire 10. The opposite chain hanger 43 may then be hooked over the hook 47 by a tool such as the screwdriver 31 shown in Fig. 2. By inserting the tool 31 in the T-shaped slot 53 and then bringing the tool over the edge of the flat hook 47, the hanger 43 may be hooked to the anchor 37, and brought to bear on the shoulders 56 of the hanger 43 by rocking the tool in a clockwise direction. By reversing the operation just described the hanger may be removed.

Means are provided for locking the hanger 43 in position on the hook 47. To this end a swivel lock 57 is provided, which consists in part of a stud 58 extending from the portion 46 and secured thereto in any convenient manner. A square-end swivel bar 59 turns on the stud 58 and is retained thereon by a peened over rivet head 61. The swivel bar 59 is adapted to turn on the stud 58 to lock against the inside face of the hook 47 thus holding the chain hanger 43 in position. It may be noted again that the tire chain anchor 37 is made of spring steel, so that by turning the swivel bar 59 with a pair of pliers or the like against the resiliency of the hook 47 of the anchor 37, the square end thereof will bear against the inside surface of the flat hook 47, and be locked thereagainst.

The provision of the longer hook 42 and the locking means with the hook 47 insures that the cross-links 44 may be held securely without the possibility of being forced off the hooks by the presence of accumulated ice or snow.

As with the embodiment shown in Figs. 1 to 4 of the drawings, by providing a plurality of T-shaped slots 53 in each chain hanger 43, any combination of two slots, one in each hanger 43, enables the cross-links 44 to be anchored in accordance with the size of the tire. It may be noted that the same marked size of tire varies with different manufacturers, and that also upon use the tires will grow in size slightly. According to the present invention, therefore, it is possible to provide a single assembly which will accommodate more than one size of tire within a specified range of sizes, thereby making it unnecessary to provide a different assembly for each size and make of tire.

While the invention has been described in terms of some preferred embodiments thereof, it is not intended that the scope of the invention be limited by the precise embodiments shown nor otherwise than by the spirit and scope of the claims here appended.

I claim:

1. For use in connection with a pneumatic tire held by inflation thereof to a straight side rim, said tire having beads continuous with side walls and a tread spanning said side walls: the improvement of a tire chain cross-link and anchor assembly comprising a tire chain anchor lying on each side of said tire and conforming to the contours of said rim and the bead of said tire and adapted to be held by inflation of the tire between said rim and said bead, comprising a metal strip having a portion bent to lie substantially along the inner periphery of the bead of said tire and between said bead and said rim, a second portion bent at substantially right angles to the first named portion and continuous therewith and following the contours of said rim and the side of the bead for at least a portion of the length thereof and terminating in a flat hook which is spaced from the side walls of said tire, and a cross-link hanger having a tongue in hooking engagement with each of said tire chain anchors and having arms carrying cross-links spanning the tread of said tire, the tongue of said hanger being provided with a plurality of T-shaped slots for changing the position of hooking engagement of said cross-link hanger with said tire chain anchor in accordance with the size of said tire, the opening defined by each T-shaped slot providing for contact of said hanger tongue with said flat hook along the oppositely extending shoulders of said T-shaped slot, and the insertion of a tool adapted to rock on the free end of said hook to lift said cross-link hanger from engagement with said tire chain anchor.

2. For use in connection with a pneumatic tire held by inflation thereof to a straight side rim, said tire having beads continuous with side walls and a tread spanning said side walls: the improvement of a tire chain cross-link and anchor assembly comprising a tire chain anchor lying on each side of said tire and conforming to the contours of said rim and the bead of said tire and adapted to be held by inflation of the tire between said rim and said bead, comprising a metal strip having a portion bent to lie substantially along the inner periphery of the bead of said tire and between said bead and said rim, a second portion bent at substantially right angles to the first named portion and continuous therewith and following the contours of said rim and the side of the bead for at least a portion of the length thereof and terminating in a flat hook which is spaced from the side walls of said tire, and a cross-link hanger having a tongue in hooking engagement with each of said tire chain anchors and having arms carrying cross-links spanning the tread of said tire, the tongue of said hanger being provided with a plurality of T-shaped slots for changing the position of hooking engagement of said cross-link hanger with said tire chain anchor in accordance with the size of said tire, the shoulders defined by said T-shaped slots providing contact of said cross-link hanger with said flat hook, and the stem portion of said T-shaped slot providing an opening for a tool for disengagement of said cross-link hanger with said tire chain anchor.

3. For use in connection with a pneumatic tire held by inflation thereof to a straight side rim, said tire having beads continuous with side walls and a tread spanning said side walls: the improvement of a tire chain cross-link and anchor assembly comprising a tire chain anchor lying on each side of said tire and held by pressure of the bead of said tire against said rim and terminating in a flat hook spaced from the side walls of said tire, and a cross-link hanger having a tongue in hooking engagement with each of said tire chain anchors and having arms carrying cross-links spanning the tread of said tire, the tongue of said hanger being provided with a plurality of T-shaped slots for changing the position of hooking engagement of said cross-link hanger with said tire chain anchor in accordance with the size of said tire, the shoulders defined by said T-shaped slot providing contact of said cross-link hanger with said flat hook, and the stem portion of said T-shaped slot providing an opening for a tool adapted to rock on one of said hooks and disengage said cross-link hanger from said tire chain anchor.

4. For use in connection with a pneumatic tire held by inflation thereof to a straight side rim, said tire having beads continuous with side walls and a tread spanning said side walls: the improvement of a tire chain cross-link and anchor assembly comprising a tire chain anchor lying on each side of said tire and conforming to the contours of said rim and the bead of said tire and adapted to be held by inflation of the tire between said rim and said bead, each of said anchors being formed of resilient metal and terminating in a hook which is spaced from the side walls of said tire, a cross-link hanger and cross link suspended from said hooks and spanning the tread of said tire, and locking means disposed on one of said hooks for preventing the unintended removal of said cross-link hangers from said hooks by snow or ice accumulating on said hooks comprising a lock having a substantially square-ended locking arm adapted to swivel into contact with the inner side of said one hook against the resiliency thereof to hold one of said cross-link hangers in hooking engagement with said one hook.

5. For use in connection with a pneumatic tire held by inflation thereof to a straight side rim, said tire having beads continuous with side walls and a tread spanning said side walls: the improvement of a tire chain cross-link and anchor assembly comprising a tire chain anchor lying on each side of said tire and conforming to the contours of said rim and the bead of said tire and adapted to be held by inflation of the tire between said rim and said bead, each of said anchors being formed of resilient metal and terminating in a hook which is spaced from the side walls of said tire, a cross-link hanger and cross link suspended from said hooks and spanning the tread of said tire, one of said hooks having a hooking arm of substantial length as compared to the hooking arm of the other of said hooks and over which one of said cross-link hangers is placed for hooking engagement with said one hook, the other of said hooks holding the other of said cross-link hangers in hooking engagement, and locking means disposed on the other of said hooks for preventing the unintended removal of said cross-link hangers from said hooks by snow or ice accumulating on said hooks, comprising a lock having a substantially square-ended locking arm adapted to swivel into contact with the inner side of the said other hook against the resiliency thereof to maintain the other of said cross-link hangers in hooking engagement with said hook.

ALFRED H. PERLMAN.

References Cited in the file of this patent

UNITED STATES PATENTS

| Number | Name | Date |
| --- | --- | --- |
| 1,030,032 | Strong | June 18, 1912 |
| 1,194,433 | Silberman | Aug. 15, 1916 |
| 2,069,979 | Stahl | Feb. 9, 1937 |
| 2,461,267 | Givens | Feb. 8, 1949 |
| 2,583,879 | Pohl | Jan. 29, 1952 |